(12) United States Patent
Laird-McConnell

(10) Patent No.: US 7,921,375 B2
(45) Date of Patent: Apr. 5, 2011

(54) INTEGRATING USER INTERFACES FROM ONE APPLICATION INTO ANOTHER

(75) Inventor: Thomas Laird-McConnell, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 987 days.

(21) Appl. No.: 11/304,788

(22) Filed: Dec. 16, 2005

(65) Prior Publication Data
US 2007/0143704 A1 Jun. 21, 2007

(51) Int. Cl.
*G06F 3/00* (2006.01)

(52) U.S. Cl. .................................................. 715/781

(58) Field of Classification Search .................. 715/781
See application file for complete search history.

(56) References Cited

U.S. PATENT DOCUMENTS

| | | | |
|---|---|---|---|
| 5,222,234 A | 6/1993 | Wang | |
| 5,226,117 A | 7/1993 | Miklos | |
| 5,530,853 A | 6/1996 | Schell | |
| 5,551,030 A * | 8/1996 | Linden et al. | 707/102 |
| 5,712,995 A * | 1/1998 | Cohn | 715/792 |
| 5,877,765 A | 3/1999 | Dickman | |
| 5,905,492 A | 5/1999 | Straub | |
| 6,026,409 A | 2/2000 | Blumenthal | |
| 6,072,489 A * | 6/2000 | Gough et al. | 715/803 |
| 6,091,409 A | 7/2000 | Dickman | |
| 6,091,411 A | 7/2000 | Straub | |
| 6,101,510 A | 8/2000 | Stone | |
| 6,161,102 A | 12/2000 | Yanagihara et al. | |
| 6,166,736 A * | 12/2000 | Hugh | 715/798 |
| 6,216,122 B1 | 4/2001 | Elson | |
| 6,216,141 B1 | 4/2001 | Straub | |
| 6,223,213 B1 | 4/2001 | Cleron | |
| 6,226,630 B1 | 5/2001 | Billmers | |
| 6,239,798 B1 * | 5/2001 | Ludolph et al. | 715/788 |
| 6,421,065 B1 | 7/2002 | Walden | |
| 6,445,822 B1 | 9/2002 | Crill et al. | |
| 6,460,058 B2 | 10/2002 | Koppolu | |
| 6,460,075 B2 | 10/2002 | Krueger | |
| 6,545,691 B1 | 4/2003 | Vallejo | |
| 6,564,321 B2 | 5/2003 | Bobo, II | |
| 6,604,150 B1 * | 8/2003 | Gebhart et al. | 719/328 |
| 6,678,724 B2 | 1/2004 | Nakajima | |
| 6,708,162 B1 | 3/2004 | Morgan et al. | |
| 6,718,518 B1 | 4/2004 | Plow | |
| 6,832,355 B1 | 12/2004 | Duperrouzel | |
| 6,963,903 B2 | 11/2005 | Krueger | |
| 7,058,944 B1 | 6/2006 | Sponheim | |

(Continued)

OTHER PUBLICATIONS

Office Action mailed Apr. 23, 2010 in U.S. Appl. No. 11/304,787, 19 pages.

(Continued)

*Primary Examiner* — Ryan F Pitaro
(74) *Attorney, Agent, or Firm* — Shook, Hardy & Bacon L.L.P.

(57) ABSTRACT

The invention discloses a system and method for integrating user interfaces (UI) within an application. The invention can be configured to display an UI of a second application within a first application in a manner that the user cannot identify that the second application's UI is displayed on top of a reference window within the first application. The invention can be configured to identify a reference window that is to be replaced by a replacement window of the second application, monitor the reference window, create the replacement window, and align the replacement window over top of the reference window.

13 Claims, 5 Drawing Sheets

U.S. PATENT DOCUMENTS

| | | |
|---|---|---|
| 7,114,128 B2 | 9/2006 | Koppolu |
| 7,254,786 B2 | 8/2007 | Henriquez |
| 7,308,480 B2 | 12/2007 | Cleron |
| 7,320,109 B1 * | 1/2008 | Zeevi et al. .................. 715/763 |
| 7,392,249 B1 | 6/2008 | Harris et al. |
| 7,406,664 B1 | 7/2008 | Morton |
| 7,426,697 B2 * | 9/2008 | Holecek et al. ............... 715/788 |
| 7,475,408 B2 | 1/2009 | Alcazar |
| 7,543,238 B2 | 6/2009 | Alcazar |
| 7,640,502 B2 * | 12/2009 | Xu et al. ...................... 715/730 |
| 7,665,032 B2 | 2/2010 | Fisher |
| 7,685,160 B2 | 3/2010 | Horvitz |
| 7,788,597 B1 | 8/2010 | Mazhar |
| 2001/0032205 A1 | 10/2001 | Kubaitis |
| 2002/0103824 A1 * | 8/2002 | Koppolu et al. ............ 707/501.1 |
| 2003/0071860 A1 * | 4/2003 | Goddard et al. ............. 345/866 |
| 2004/0075686 A1 * | 4/2004 | Watler et al. ................. 345/749 |
| 2005/0060337 A1 | 3/2005 | Chou et al. |
| 2005/0267869 A1 | 12/2005 | Horvitz |
| 2005/0278323 A1 | 12/2005 | Horvitz |
| 2005/0289109 A1 | 12/2005 | Arrouye et al. |
| 2006/0004705 A1 | 1/2006 | Horvitz |
| 2006/0112081 A1 | 5/2006 | Qureshi |
| 2006/0123356 A1 | 6/2006 | Sobeski |
| 2006/0271854 A1 | 11/2006 | Racovolis |
| 2007/0016543 A1 | 1/2007 | Epling |
| 2007/0061722 A1 * | 3/2007 | Kronlund et al. ............. 715/705 |
| 2007/0168878 A1 * | 7/2007 | Berstis et al. ................ 715/790 |
| 2008/0120596 A1 | 5/2008 | Kothari |
| 2010/0058167 A1 | 3/2010 | Kim |

OTHER PUBLICATIONS

"Office Action mailed Dec. 22, 2009 in U.S. Appl. No. 11/304,787, 22 pages".

* cited by examiner

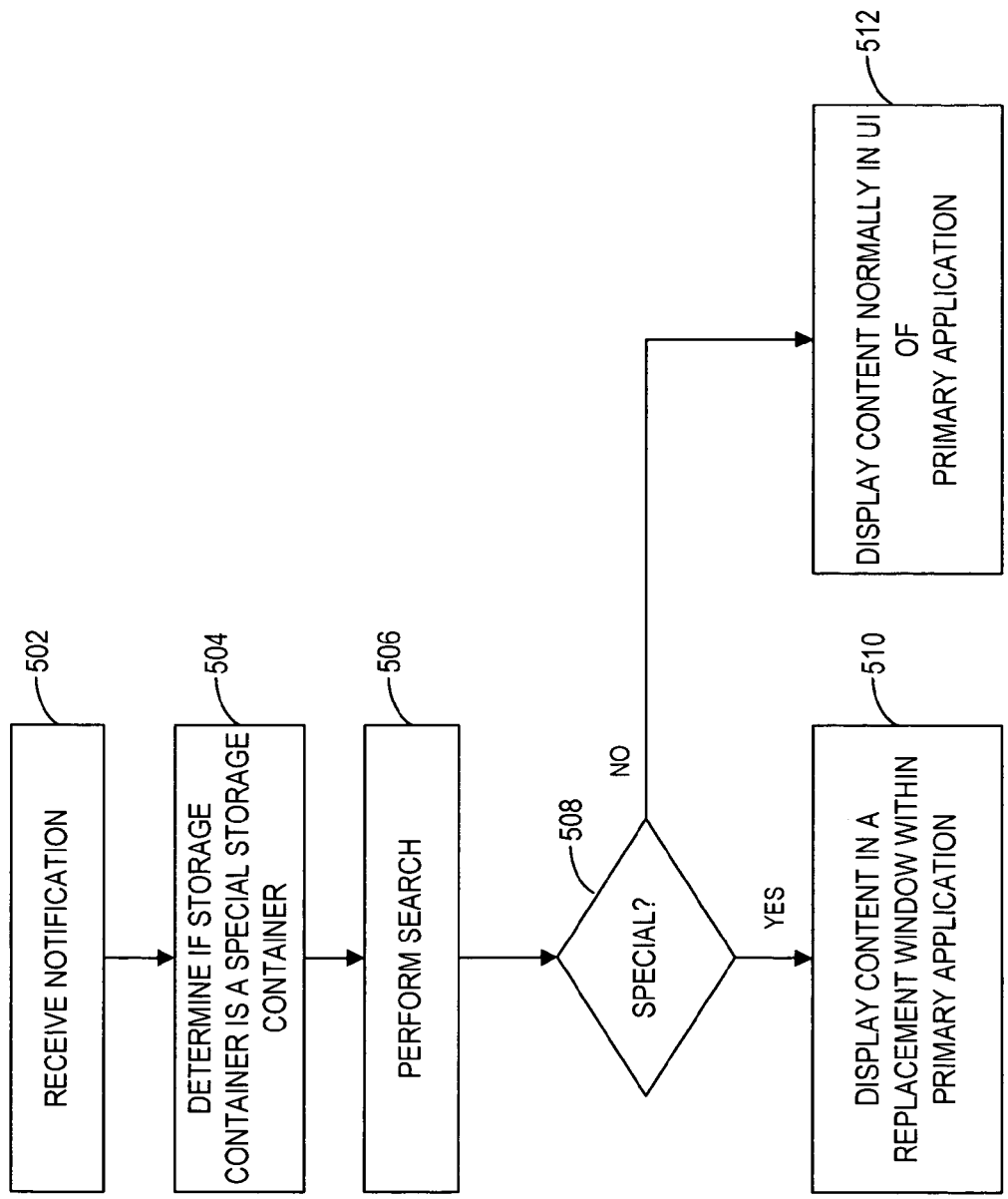

INTEGRATING USER INTERFACES FROM ONE APPLICATION INTO ANOTHER

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Search engines attempt to find data and content that users are interested in locating. The data and content indexed by a conventional search engine can come from various sources and applications including applications found on users' computers and/or from sources found on the Internet. Finding and displaying the results from a search engine is useful, but it may also be desirable to display search results in the context of the application that created the search request. Many applications do not provide a way for the search results from other applications to be integrated into them. For example, although conventional applications can provide for a custom toolbar to be placed in the application, search results from another application must be placed in floating window. Floating windows can be problematic as they can obstruct the viewable areas of the primary application.

Another problem can arise in that a searching application program interface (API) of the primary application that a user is currently working in may not use an index of aggregated data to search for requested content. Therefore, the primary application's searching API may have to spend additional time conducting a search every time a search query is received instead of going directly to an index that has already aggregated a plurality of data that corresponds to the requested content.

SUMMARY

A system and method are disclosed for integrating user interfaces within an application. The method discloses identifying one or more reference windows with each of the one or more reference windows having a size. The method further discloses monitoring the one or more reference windows, and creating at least one replacement window having the same size as the one or more reference windows. Additionally, the method discloses aligning the at least one replacement window over the one or more reference windows.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates an embodiment of a method for searching for search results using a search query from a storage container

DETAILED DESCRIPTION

It may be desirable to obtain a way for displaying search results from another application that can be integrated seamlessly into a primary application. It may also be desirable to use a secondary application that has access to a search engine to search for results and display the search results with its own user interface (UI) within the primary application in a seamless manner unbeknown to the user. Additionally, it may be desirable to save search queries within the primary application in a manner that when the user subsequently accesses the saved search query, the secondary application is able to identify when to step-in and conduct a search instead of using the primary application's searching API and thus saving the user valuable time.

The invention discloses a system and method for integrating user interfaces (UI) within a UI of a primary application residing on a client. The primary application can represent an application that is having UIs integrated within it. The UIs can include content from other secondary applications other than the primary application. The content can be, for example, search results, web pages, multimedia content, documents, or other any other type of information that can be displayed to a user. The invention can be configured to position the UI of the secondary application over a corresponding UI of the primary application in a seamless manner. Preferably, this is accomplished so that the user cannot identify that a second UI is displayed on top of the first UI. The UI of the secondary application can be integrated seamlessly within the primary application by positioning the secondary UI over the a corresponding primary UI in a manner that hides all areas of the primary UI.

The invention further discloses a system and method for creating storage containers of search queries within an application, and for subsequently searching for content by using the search queries from the storage container. The storage container can be, for example, a folder within the application that can store any type of information. The invention can be configured to store a search query in storage container within a primary application, wherein the search query can be used to request content from one or more secondary sources. Moreover, the invention can be configured to subsequently search for content within a secondary source when a user subsequently accesses a search query stored in the storage container within the primary application. Once the content has been found, the invention can display the content from the secondary source seamlessly within the primary application by positioning an UI that includes the content over a corresponding window within the primary application.

Figure 1:
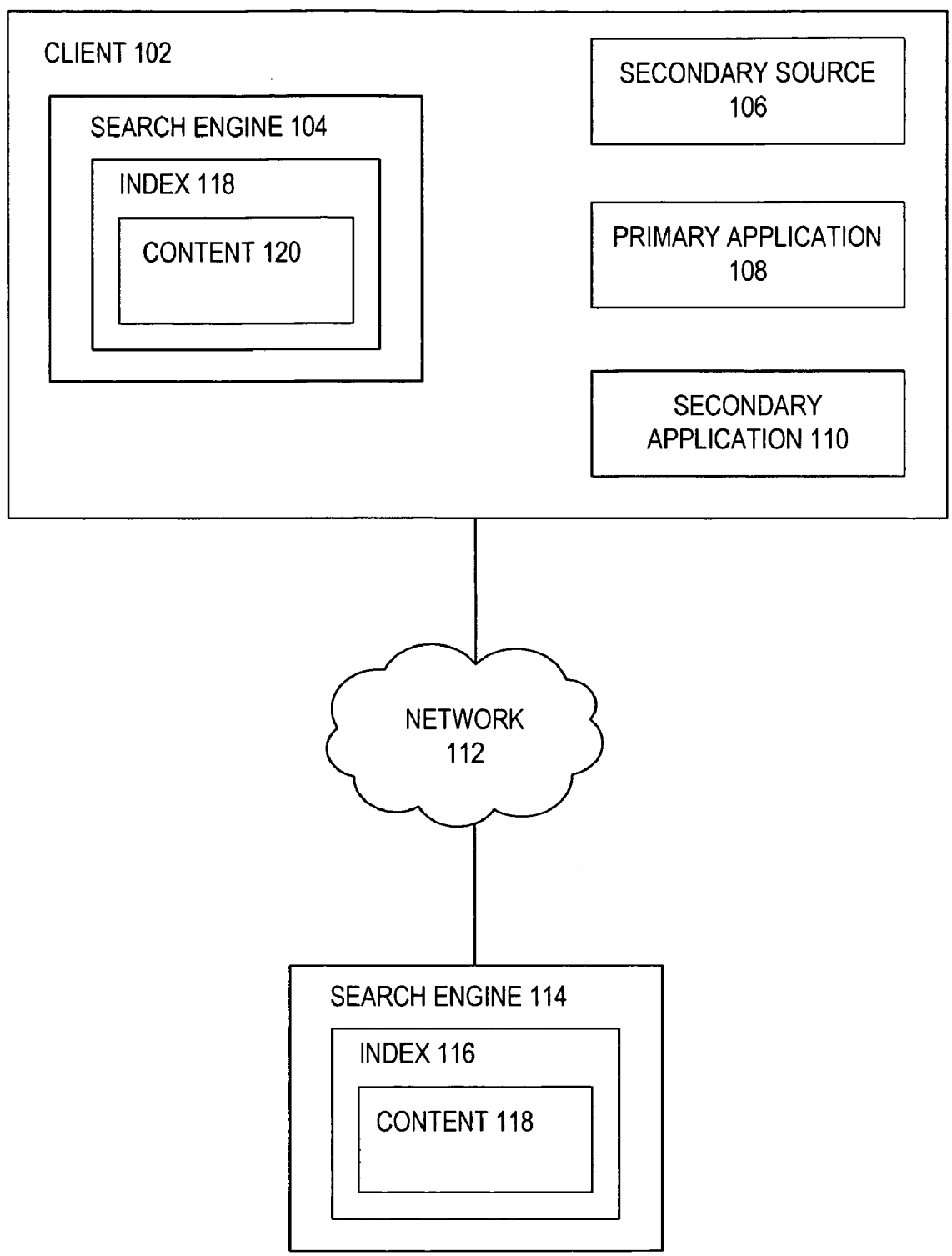
FIG. 1 illustrates an embodiment of a system for implementing the invention.

FIG. 1 illustrates an embodiment of a system for implementing the invention. Client 102 may be or include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. Client 102 may also be or can include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Client 102 typically includes a variety of computer-readable media. By way of example, and not limitation, computer-readable media may comprise computer-readable storage media. Examples of computer-readable storage media include but are not limited to: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by client 102. Computer-readable storage media may store computer-executable instructions, modules, and/or components for execution by one or more computer systems.

Client 102 can include a communication interface. The communication interface may be an interface that can allow the client to be directly connected to any other client or device or allows the client 102 to be connected to a client or device over network 112. Network 112 can include, for example, a local area network (LAN), a wide area network (WAN), or the Internet. In an embodiment, the client 102 can be connected to another client or device via a wireless interface.

Client 102 can have a primary applications 108 installed internally. The primary application 108 can be the application that the user is currently working in. The primary application 108 can be any type of application that can be stored on a client. For example, primary application 108 can be a Microsoft Outlook application, a media player application, a word processing application, or any other application. Client 102 can additionally have one or more secondary sources 106 stored within it. Secondary sources can be any application, component, process, data storage container, or program stored on client 102 other than the primary application 108. Moreover, client 102 can include secondary application 110. The secondary application 110 is a secondary source and can be used to position its own UI including content from one or more secondary sources 106 within a UI of the primary application 108. The content can be, for example, search results, web pages, multimedia content, documents, or other any other type of information that can be displayed to a user.

The secondary application 110 can utilize search engine 104 or 114 to search for content from a plurality of secondary sources and the primary application 108 in order to find relevant content corresponding to a user's request. As shown in FIG. 1, the search engine 104 can be a stand-alone component, however, in other embodiments, the search engine 104 can be integrated within the secondary application or another secondary source. The search engine 104 can generate an index 118 of content 120 from a plurality of secondary sources 106 and the primary application 108. Additionally, the secondary application can search one or more search engines 114 via network 112. Search engine 114 can generate an index 116 that can include a plurality of content 118 from a plurality of secondary sources found via network 112. The secondary application 110 can utilize search engines 104 and 114 to find relevant content that corresponds to a particular search request from a user. Once relevant content has been identified by the secondary application 10, it can position its own UI including content from the search engine 104 or 114 within a UI of the primary application 108.

Figure 2A:
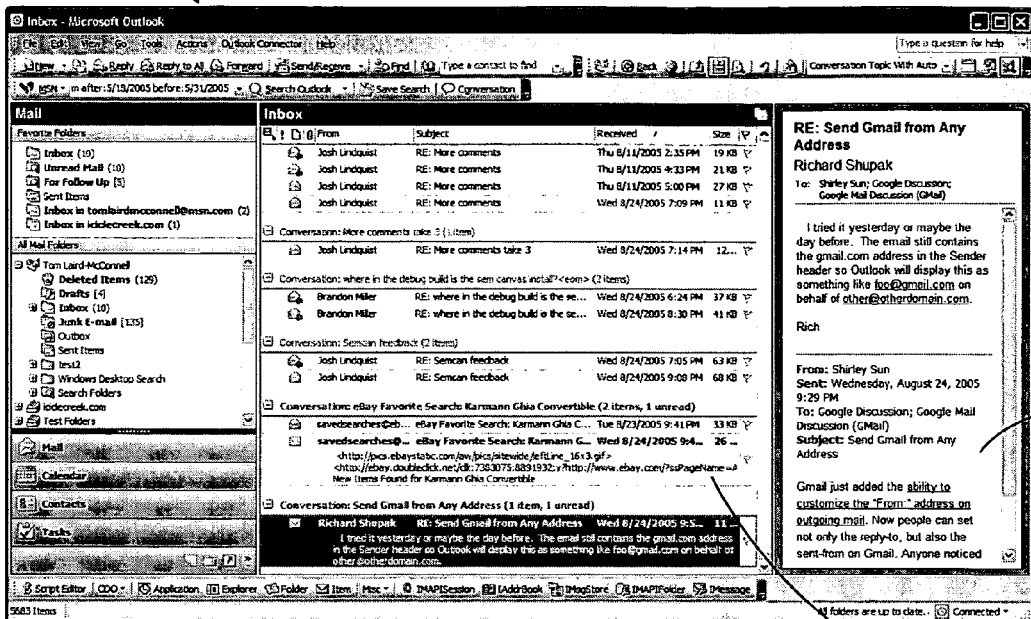
FIGS. 2A and 2B illustrate an embodiment of displaying content from one or more secondary sources within a UI of a primary application using a secondary application.
Figure 2B:
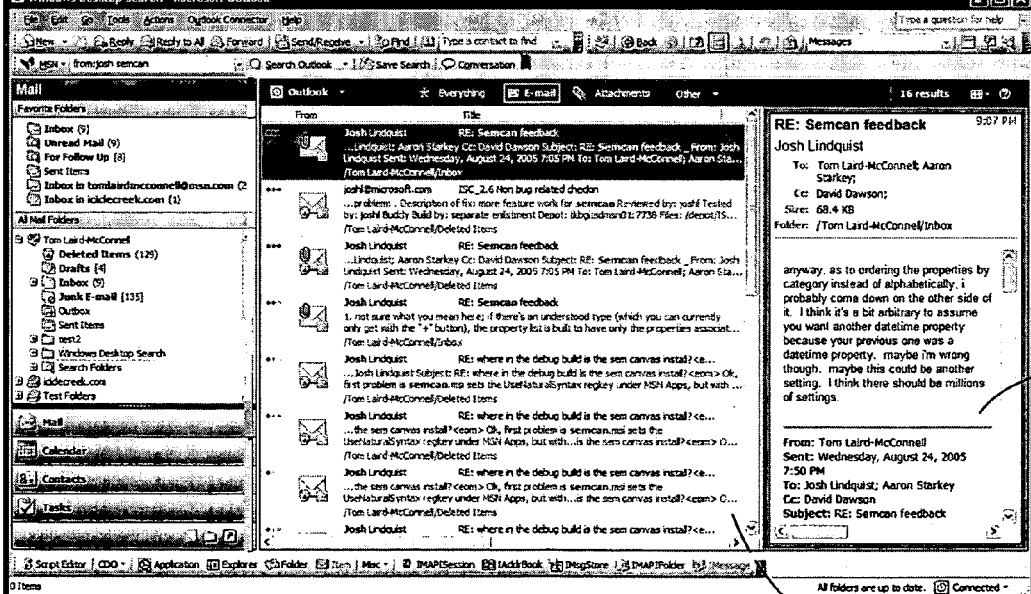

FIGS. 2A and 2B illustrate an embodiment of displaying content from one or more secondary sources within a UI of a primary application using a secondary application. UI 202 is a UI of a primary application. In FIGS. 2A and 2B, the primary application is Microsoft Outlook, however, the invention can utilize any application as a primary application and should not be limited to only Microsoft Outlook. In FIG. 2A, the UI of the primary application 202 can include any number of reference windows 204 and 206. The reference windows 204 and 206 can be windows within the primary application that may be replaced with one or more UIs of a secondary application. In FIG. 2B, replacement windows 208 and 210 can be UIs of a secondary application that can be integrated within the UI 202 of the primary application. The replacement windows 208 and 210 can have the same size of reference windows 204 and 206 respectively, and can be positioned over reference windows 204 and 206 respectively in a position that hides areas of the reference windows 204 and 206. Since all areas of the reference windows can be hidden by the replacement windows, a seamless integration of a UI of a secondary application can be achieved.

Figure 3:
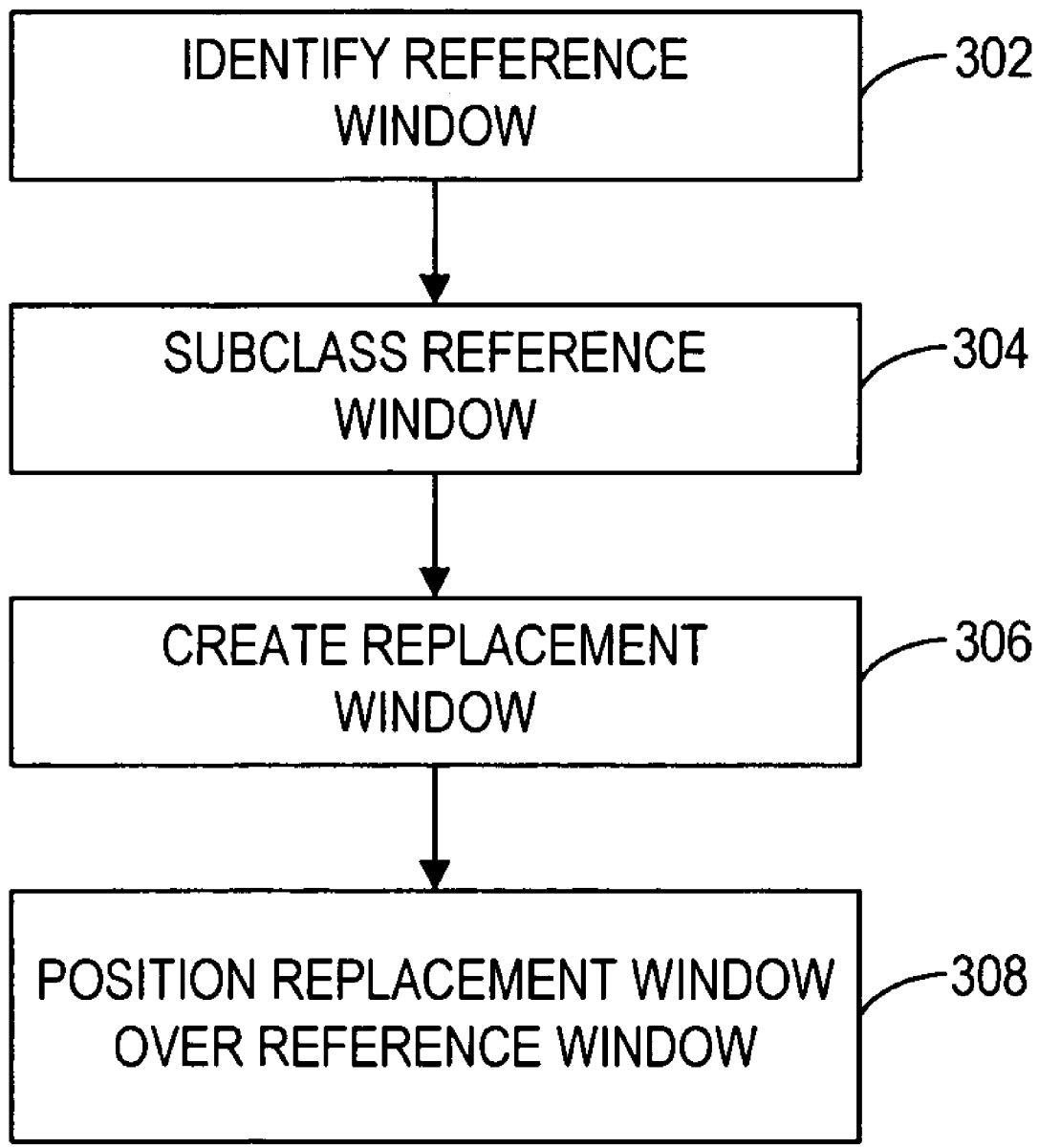
FIG. 3 illustrates an embodiment for integrating an application's user interface within another application.

FIG. 3 illustrates an embodiment for integrating an application's user interface within another application. In step 302, a secondary application can identify one or more reference windows that it desires to replace. The secondary application can include an application program interface (API) that can enumerate all windows within the client area of a user's browser and can identify applications that currently have windows running within the browser.

In an embodiment, a method for identifying a reference window can include an API searching for an reference identifier that corresponds to the primary application's one or more reference windows that the secondary application is interested in replacing. The reference identifier can be, for example, a class name of the of the window, however, the reference identifier should not be limited to only class names and can encompass any other means for identifying a window.

In step 304, the secondary application can monitor the one or more reference windows. By monitoring the windows the secondary application can intercept and view any/all messages that are sent to any monitored window. The messages, for example, can contain information regarding any changes that are about to take place with the reference window. In an embodiment, the secondary application can monitor the reference windows by subclassing the reference windows. In other embodiments, the secondary application can monitor a reference window by using other means such as window hooks, superclassing, and polling. In step 306, the secondary application can create one or more replacement windows that can be used to replace one or more reference windows. The replacement window can be an UI of the secondary application, and can be used to display content from one or more secondary sources. The replacement window can have the same size of the reference window that it will replace. In step 308, the one or more replacement windows can be positioned over the one or more reference windows. The replacement windows can be aligned over the one or more reference windows in a position that hides areas of the reference windows. More specifically, the replacement windows can have the same size as the reference windows and, therefore, the outer borders of the replacement windows can be aligned directly over the top of the outer borders of the reference windows. Since the replacement windows can have the same size of the respective reference windows that they are replacing, the replacement windows can be aligned in a manner that does not obstruct the view of any other viewable areas of the client area of the user's browser. Being that the referenced windows are being monitored, the secondary application can reposition the replacement windows, including resizing the replacement windows, in sync with the reference windows whenever the secondary application intercepts a message that discloses that the reference windows are going to resize or move to another location.

Additionally, the one or more replacement windows can be removed when it is detected that the replacement windows are no longer active. For example, if the user decides to access another folder, application, component, process, or program that does not pertain to the reference window that the replacement window is replacing, the secondary application can then simply remove the replacement window. The replacement window can also be removed to unhide the reference window whenever an event is detected that requires the secondary application to toggle back and forth from the hiding and un-hiding the reference window with the replacement window.

The invention can also be configured to generate storage containers within a primary application in order to store requests for content, made from users within the primary application, that can be processed by the secondary application. The requests for content can be, for example, search queries. Again, the content can include, for example, search results, web pages, multimedia content, documents, or other any other type of information that can be displayed to a user. The content can come from the primary application and/or one or more secondary sources.

Figure 4:
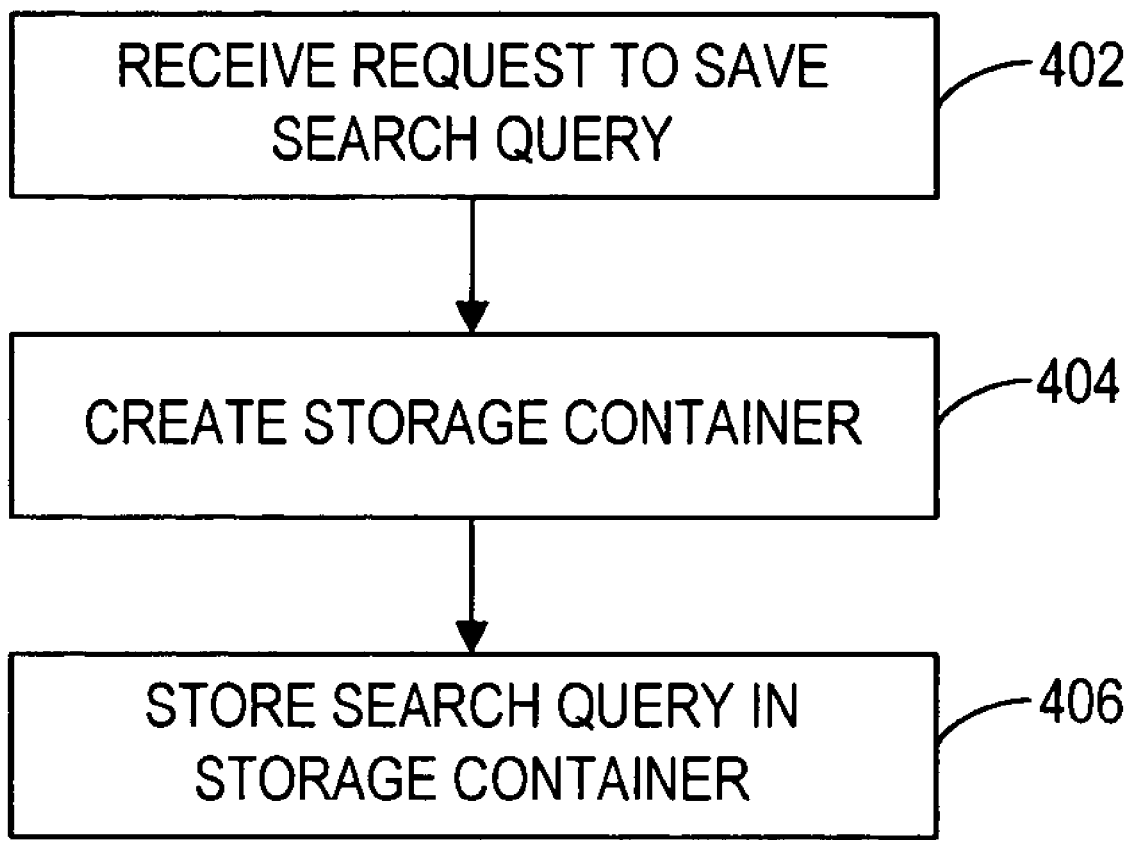
FIG. 4 illustrates an embodiment of a method for creating a storage container for a search query within a primary application.

FIG. 4 illustrates an embodiment for creating a storage container for a search query within a primary application. The search query can correspond to a request for content that the user previously made. The search query can include text that relates to the content that the user is interested in obtaining. The search query can be created by the user within the primary application. Additionally, the user can add scoping parameters with the search query to further define his/her search. The scoping parameters can be various options that a user can select in order to further define the user's search. In an embodiment, the user can select the scoping parameters within the primary application. In another embodiment, the scoping parameters can be buttons that are part of a toolbar that a user can select within the primary application. In another embodiment, the scoping parameters can be located within a secondary source. In yet another embodiment, the scoping parameters can be added programmatically, for example by using a wizard, and a list of pre-defined scoping parameters can be added to the user's search query. For example, if the primary application that the user wanted to search through was Microsoft Outlook, the wizard can be used to include a plurality of scoping parameters such as searching through all messages that are important, searching through all messages that have been unread, searching through messages from a particular person, or any other scoping parameter that can be programmed to be included with a user's search query. The scoping parameters can further define a user's search by defining where the user would like to search including particular areas of the primary application or secondary sources within the client or over the network If a user decides to save the search query, the user can choose an option within the primary application that can allow the user to save the query. For example, in an embodiment, the user can select a button on the UI of the primary application that allows the user to save the search query. In step 402, the secondary application 110 (FIG. 1) can receive a request to save a search query from the user after the user chooses an option to save the search query. In step 404, the secondary application can create a storage container for the search query. The storage container can be, for example, a folder for storing information. In an embodiment, the secondary application can create the storage container to be located within the primary application. In other embodiment, the storage container can be at a location other than within the primary application. The secondary application can store the search query along with one or more other identifiers that can be stored within the storage container, wherein the search query can be considered as an identifier. The one or more other identifiers can include an URL, scoping parameters, or any other type of identifier to distinguish the search query included with the other identifiers from another search query.

In step 406, the search query and the other identifiers can be stored within the storage container. An identifier that is an URL can be stored in a field within storage container. The URL can be used to associate a web page with the storage container. The actual search query can be stored in a description field within the storage container, and can be used to name the storage container. For example, a search query of "patent disclosure" can be stored in a description field of the storage container which can give the storage container the name "patent disclosure." In an embodiment, the secondary application can create a special storage container when the search query or the other identifiers that are to be stored indicate that the secondary application is to be used in order to search for search results with an external search engine from the primary application, and present search results using its own UI within the UI of the primary application.

FIG. 5 illustrates an embodiment of a method for searching for search results using a search query from a storage container. When a user accesses a storage container within the primary application to select a stored search query to perform a search, the primary application can send a notification to the secondary application informing it that the user is accessing the particular storage container. The secondary application can receive the notification at step 502. At step 504, the secondary application can determine if the storage container that the user accessed is a special storage container or not. The secondary application can determine if the storage container is a special storage container by looking at the one or more identifiers within the storage container to see if the secondary application will need to present its UI within the primary application to display the requested content. Again the one or more other identifiers can include the search query, an URL, scoping parameters, or any other type of identifier to distinguish the search query included with the other identifiers from another search query.

In step 506 the secondary application can perform a search using a searching component based from the search query and the one or more other identifiers. The search can be performed within the primary application, within a secondary source located within the client, within a secondary source over a network, within a search engine that can index content from secondary sources over the network, or through any other means for searching for content through secondary sources. In step 508 if it was determined that the storage container was a special storage container, at step 510, the secondary application can create one or more replacement windows for displaying the requested content as outlined in FIG. 3, and can be position the one or more replacement windows over one or more reference windows in a position that hides areas of the reference windows as discussed in FIG. 3. If, however, it was determined that the storage container is not a special storage container, then the secondary application can allow the primary application to display the requested content as the primary application normally would within its own UI at step 512.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. A computer system including one or more computer-readable storage media having computer-executable components stored thereon for integrating user interfaces within an application, the computer-executable components comprising:
    an identification component for identifying one or more reference windows having a size within a primary application via a secondary application;
    a monitoring component for monitoring the one or more reference windows within the primary application via the secondary application;
    a window creating component for creating at least one replacement window having the size by the secondary application, wherein the at least one replacement window corresponds to the secondary application different from the primary application, the secondary application stored on the computer system; and
    an aligning component for aligning the at least one replacement window over the one or more reference windows in a position that hides all areas of the one or more reference windows.

2. The computer system according to claim 1, wherein the at least one replacement window changes its position via the secondary application in a same manner as how the one or more reference windows changes positions such that the one or more reference windows remain hidden.

3. The computer system according to claim 1, wherein the at least one replacement window displays the search results.

4. The computer system according to claim 1, further comprising: a search component to generate search results via the secondary application using a search query saved in a storage container located in the primary application.

5. The computer system according to claim 4, wherein the search query is stored in the storage container of the primary application by the secondary application.

6. The computer system according to claim 1, wherein the at least one replacement window is removed when it has been detected that the at least one replacement window is no longer active.

7. One or more computer-readable storage media having computer-usable instructions stored thereon for performing a method for integrating an application's user interfaces within another application, the method comprising:
    ascertaining a plurality of windows within a primary application client area of a user's browser via a secondary application;
    identifying one or more applications by the secondary application having at least one of the plurality of windows running within the browser, wherein the one or more applications are installed on a computing device;
    identifying one or more reference windows having a size from the plurality of windows within the primary application via the secondary application;
    monitoring the one or more reference windows within the primary application via the secondary application;
    receiving, at the secondary application, a request to activate a previously-saved search query located within a storage container of the primary application;
    creating at least one replacement window by the secondary application having the size from the plurality of windows, wherein the at least one replacement window corresponds to the secondary application different from the primary application; and
    aligning the at least one replacement window over the one or more reference windows in a position that hides all areas of the one or more reference windows.

8. The computer-readable storage media according to claim 7, wherein identifying the one or more reference windows comprises searching for at least one identifier, the at least one identifier being a class name of the reference window.

9. The computer-readable storage media according to claim 7, further comprising changing the position of the at least one replacement window via the secondary application in a same manner as how the one or more reference windows changes positions, wherein the one or more reference windows remain hidden.

10. The computer-readable storage media according to claim 7, further comprising detecting when the at least one replacement window is no longer active.

11. The computer-readable storage media according to claim 10, further comprising removing the at least one replacement window when it has been detected that the at least one replacement window is no longer active.

12. The computer-readable storage media according to claim 7, wherein the at least one replacement window displays search results from activating the search query.

13. The computer-readable storage media according to claim 7, wherein the storage container was created by the secondary application within the primary application.

\* \* \* \* \*